US012151509B2

(12) United States Patent
Sitzes et al.

(10) Patent No.: US 12,151,509 B2
(45) Date of Patent: Nov. 26, 2024

(54) WHEEL HUB ASSEMBLY AND METHOD OF TESTING

(71) Applicant: FEDERAL-MOGUL MOTORPARTS LLC, Southfield, MI (US)

(72) Inventors: Larry Sitzes, Maryland Heights, MO (US); Richard W. Harvey, Maryland Heights, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 1078 days.

(21) Appl. No.: 17/068,455

(22) Filed: Oct. 12, 2020

(65) Prior Publication Data

US 2022/0112920 A1  Apr. 14, 2022

(51) Int. Cl.
*B60B 27/00* (2006.01)
*F16C 33/78* (2006.01)

(52) U.S. Cl.
CPC ...... *B60B 27/0073* (2013.01); *B60B 27/0068* (2013.01); *F16C 33/7896* (2013.01); *B60B 27/0005* (2013.01)

(58) Field of Classification Search
None
See application file for complete search history.

(56) References Cited

U.S. PATENT DOCUMENTS

| 5,492,393 | A | * | 2/1996 | Peisker | F16C 33/723 |
| | | | | | 301/108.4 |
| 5,882,121 | A | | 3/1999 | Shigeharu | |
| 7,108,427 | B2 | | 9/2006 | Joki et al. | |
| 7,264,249 | B2 | | 9/2007 | Yokoyama et al. | |
| 7,380,797 | B2 | | 6/2008 | Katogi et al. | |
| 7,901,141 | B2 | | 3/2011 | Takahashi | |
| 8,371,586 | B2 | | 2/2013 | Okaji et al. | |
| 9,074,689 | B2 | | 7/2015 | Duch et al. | |
| 9,090,122 | B2 | | 7/2015 | Morita et al. | |
| 9,140,305 | B2 | | 9/2015 | Gulli | |

(Continued)

FOREIGN PATENT DOCUMENTS

CN   103967938 A   8/2014
CN   111503162 A   8/2020

(Continued)

OTHER PUBLICATIONS

ASTM D570-98, Standard Test Method for Water Absorption of Plastics, Jun. 2010, ASTM International (Year: 2010).*

(Continued)

*Primary Examiner* — Erica S Lin
(74) *Attorney, Agent, or Firm* — Robert L. Stearns; Dickinson Wright PLLC (57) ABSTRACT

A wheel hub assembly includes a mounting base and a wheel hub supported for rotation on the mounting base by a plurality of bearings disposed within an annular space between the hub and base. A sealing system is provided that seals all points of intrusion into the space such that liquid contaminants are inhibited or precluded from entering the space and reaching the bearings when the assembly is subjected to an immersion/thermal shock test in which the assembly is heated to an elevated temperature and then immersed on a cold bath of the liquid contaminant. A method of testing the sealing integrity of wheel hub assemblies is also provided.

10 Claims, 4 Drawing Sheets

(56) References Cited

U.S. PATENT DOCUMENTS

| | | |
|---|---|---|
| 9,328,771 B2 | 5/2016 | Duch et al. |
| 9,358,833 B2 | 6/2016 | Gulli |
| 9,751,361 B2 | 9/2017 | Seki et al. |
| 9,771,981 B2 | 9/2017 | Baracca et al. |
| D799,383 S | 10/2017 | Kong et al. |
| D859,257 S | 9/2019 | Winter et al. |
| 10,527,100 B2 | 1/2020 | Falaschi et al. |
| 2007/0201782 A1 | 8/2007 | Miyagawa et al. |
| 2007/0278748 A1 | 12/2007 | Hiroki |
| 2008/0044120 A1 | 2/2008 | Komori |
| 2009/0192750 A1* | 7/2009 | Huang ............... G01R 31/2834 702/104 |
| 2012/0281939 A1 | 11/2012 | Nakamura et al. |
| 2013/0195389 A1 | 8/2013 | Seki et al. |
| 2018/0066711 A1 | 3/2018 | Tatsuo et al. |
| 2018/0186181 A1 | 7/2018 | Tada et al. |
| 2018/0223900 A1 | 8/2018 | Khan et al. |
| 2018/0340576 A1 | 11/2018 | Khan et al. |
| 2019/0024800 A1 | 1/2019 | Baart |

FOREIGN PATENT DOCUMENTS

| | | |
|---|---|---|
| EP | 3040566 B1 | 3/2019 |
| JP | 2007211848 A | 8/2007 |
| JP | 2011226620 A | 11/2011 |
| JP | 2012082913 A | 4/2012 |
| JP | 2013190080 A | 9/2013 |
| WO | 2007138738 A1 | 12/2007 |

OTHER PUBLICATIONS

International Search Report, mailed Feb. 7, 2022 (PCT/US2021/053408).

* cited by examiner

WHEEL HUB ASSEMBLY AND METHOD OF TESTING

BACKGROUND OF THE INVENTION

1. Technical Field

This invention relates generally to wheel hub assemblies and to methods for testing wheel hub assemblies.

2. Related Art

Wheel hub assemblies are used to support a wheel for rotation on a vehicle. Such wheel hub assemblies include a base which typically mounts to structure of the vehicle, such as the steering knuckle, and a wheel hub supported by two sets of bearings for rotation relative to the base. The wheel hub carries a set of studs for securing the wheel.

The bearing sets of such wheel hub assemblies are typically captured in the space between the base and wheel hub and are shielded from the external environment by inboard and outboard seals which act to exclude foreign matter and other contaminants, such as mud, sand, salt, water and the like, from entering the space and damaging the bearings. Numerous seal designs have been proposed, but none have proven to be entirely successful in excluding contaminants under especially harsh conditions, such as heavy use and thermal shock that may occur, for example, when encountering a sudden deep pool of water or slush on the road or when backing a boat trailer into the water after a long haul. Vehicles especially suited for use in harsh condition (e.g., SUV's) may be especially prone to hub damage from breach of the seals. In addition to the seals, there are other pathways for contaminants to enter the bearing space for wheel hub assemblies equipped with ABS sensors, such as the opening through which the sensor wire passes. While the wire may carry a boot for shielding against water infiltration, the seal is prone to at least some level of leakage, allowing water to enter the bearing space.

Applicant uses an immersion test to validate the sealing integrity of its wheel hub assemblies, wherein a newly manufactured wheel hub assembly is weighed and then fully immersed in a water solution containing a fluorescent-sensitive dye for a 1 hour period. The wheel hub assembly is then allowed to dry and is reweighed to detect any increase in mass attributable to any water solution having breached the seals and entered the sealed interior of the assembly. Further physical inspection may include disassembling the wheel hub to detect, with the assistant of fluorescent light, the presence of any of the water solution within the interior of the assembly. The lack of a significant change in mass and/or the absence of a breach of the seals by physical inspection of the sealed interior for the presence of water solution indicated an acceptable performance of the wheel hub sealing system. It is believed that other manufactures employ similar immersion and inspection tests.

Applicant has discovered that current validation methods may not account for certain harsh conditions that a wheel hub assembly may experience in operation, and that seal assemblies determined to be acceptable based on current validation standards may nonetheless fail to exclude contaminants such as water from breaching the seals under certain extreme conditions. In particular, wheel hub sealing systems may be compromised when subjected to thermal cycling, such as when the wheel hub is operated under heavy load and is caused to be heated to a high temperature followed by exposure to a sudden cooling environment, particularly in the presence of a contaminant, such as the wheel hub becoming fully or partially immersed in cold water, slush or other liquid-based media. This may happen, for example, when a hot wheel hub encounters a pool of slush or water on the road or is immersed in a lake when trailering a boat or the like. Such know wheel hub assemblies shown to have their seals compromised by being subjected to thermal shock prior to immersion in water include Radical 513179, AC Delco 19259596, Timken TKSHF00028, GMB 730-0003, NTN WE60702, Dorman 951-061, Mevotech TXF513121 and Kaiyuan 513179. All allowed 5 or more grams of water to intrude past the seals to the interior of the wheel hub assemblies where the bearings reside.

Improvements in sealing and testing are needed in order to address these current deficiencies.

SUMMARY

A wheel hub assembly, comprises a mounting base, a wheel hub: and an annular gap between the mounting base and wheel hub. Lubricated bearings are disposed in the annular gap for supporting the wheel hub for rotation relative to the mounting base. A plurality of seals are provided for limiting the intrusion of external contaminants into the annular gap to form a sealed space for the bearings. The plurality of seals are selected to have a seal integrity such that a contaminant is precluded from entering the sealed space when subjected to a heat flux cycle in excess of 100° and preferably greater in the presence of the contaminant.

The seals thus have a higher than normal integrity and robustness that enable the wheel hub assembly to withstand extreme thermal shock use conditions without leaking, and particularly conditions where the hub assembly is under heavy use or otherwise running hot, followed by a sudden quench of the wheel hub assembly in a bath of the contaminant at a low temperature.

A method for testing wheel hub assemblies for suitability under harsh conditions is also provided. The method includes subjecting a wheel hub assembly having a sealed bearing space to a heating environment followed by subjecting the assembly to a cooling environment in the presence of a contaminant, and evaluating the assembly for any ingress of contaminant into the sealed bearing space, and determining the assembly to be compliant if little or no contaminant is found in the sealed space after the test.

According to one aspect, the heating environment may preferably be one where all or part of the assembly is heated to about 200° F., and the cooling environment may be one where the assembly is subjected to a medium set at about 40° F. or below, such that the assembly is first very hot and then quenched in the presence of the contaminant.

According to another aspect, the contaminant for testing purposes may be a water-based medium, such as pure water or water with an additive such as salt or other corrosive or non-corrosive constituents. The water-based medium may further contain mud or other debris representative of mediums and conditions a vehicle is likely to encounter in harsh use.

According to another aspect, the seals of the wheel assembly may include at least one inboard seal assembly and at least one outboard seal assembly, with inboard and outboard being in relation to the orientation of the wheel assembly when installed on a vehicle. Both inboard and outboard seal assemblies are designed to pass the subject integrity test.

According to another aspect, the outboard seal assembly includes an inner primary seal and a separate outer secondary seal. Both inner and outer seals have seal carriers that are press-fit onto the base and respective annular seal lips which dynamically engage the rotatable wheel hub. The press-fit of the carrier forms a fluid-tight seal with the base, as do the dynamic seals, with the outer seal serving as the front line seal to protect the inner seal against unprotected exposure to contaminants. The inner seal may have three dynamic seal lips, and the outer seal may have at least one dynamic seal lip outward of the three primary lips that positively engages the wheel hub within the gap formed between the wheel hub and base, and preferably at a thickened inner region of the hub flange.

According to another aspect, the inboard seal has a carrier that is press-fit onto the base in combination with a curable sealant to form a leak-proof seal at the joint between the carrier and base. The inboard seal includes a plurality of dynamic annular seal lips that positively engage a rotatable surface on the wheel hub to effect a seal. The engaging surface may be in the form of a slinger that is press fit onto the wheel hub adjacent the inboard seal. The slinger may be provided with a rubber sealant to form a fluid-tight seal at the interface between the slinger and the wheel hub. The slinger may have an annular mounting portion that is generally coaxial with an axis of the wheel hub and an annular slinger flange projecting radially outwardly of the mounting portion. Two seal lips of the inboard seal may engage the annular mounting portion and two additional seal lips of the inboard seal may engage the inner face of the slinger flange, such that all seals are interior to the slinger walls and all positively engage the annular or radially extending surfaces of the slinger for precluding the entry of contaminants when subjected to the new integrity test.

A wheel hub assembly as shown and described herein is one proven to have a sealing integrity that outperforms known prior competitive wheel hub assemblies subjected to the same new integrity test, evidencing that such a new wheel hub assembly will perform under even the most harsh real world conditions of thermal shock in the presence of contaminants at a new level not shared by the known competitive wheel hubs which were shown to fail the new test.

The testing method shown and described herein represents a new and heightened standard not previously known or contemplated in the industry by which purchasers of newly manufactured wheel hub assemblies will be able to distinguish those wheel hub assemblies that are capable of performing acceptably under extreme use conditions from those that are not by means of the new integrity test.

Those skilled in the art will thus recognize that the improved inventive wheel hub integrity test raises the bar in the industry to levels not previously known or contemplated by incorporating extreme thermal cycling conditions in the presence of contaminants while testing the sealing capabilities of wheel hubs to differentiate those wheel hubs assemblies that can perform acceptably under such harsh conditions from those that cannot. While newly manufactured competitive wheel hub assemblies are known to pass prior integrity tests which do not include extreme thermal cycling while in the presence of contaminants, such assemblies have been shown to fail the new integrity test and only the new wheel hub assembly of the applicant was shown to pass.

THE DRAWINGS

These and other features and advantages of the present invention will become better understood when considered in connection with the detailed description of preferred embodiments and the representative drawings, in which.

DETAILED DESCRIPTION

Described are embodiments of a wheel hub assembly and a test for validating the sealing integrity of a wheel hub.

Figure 1:
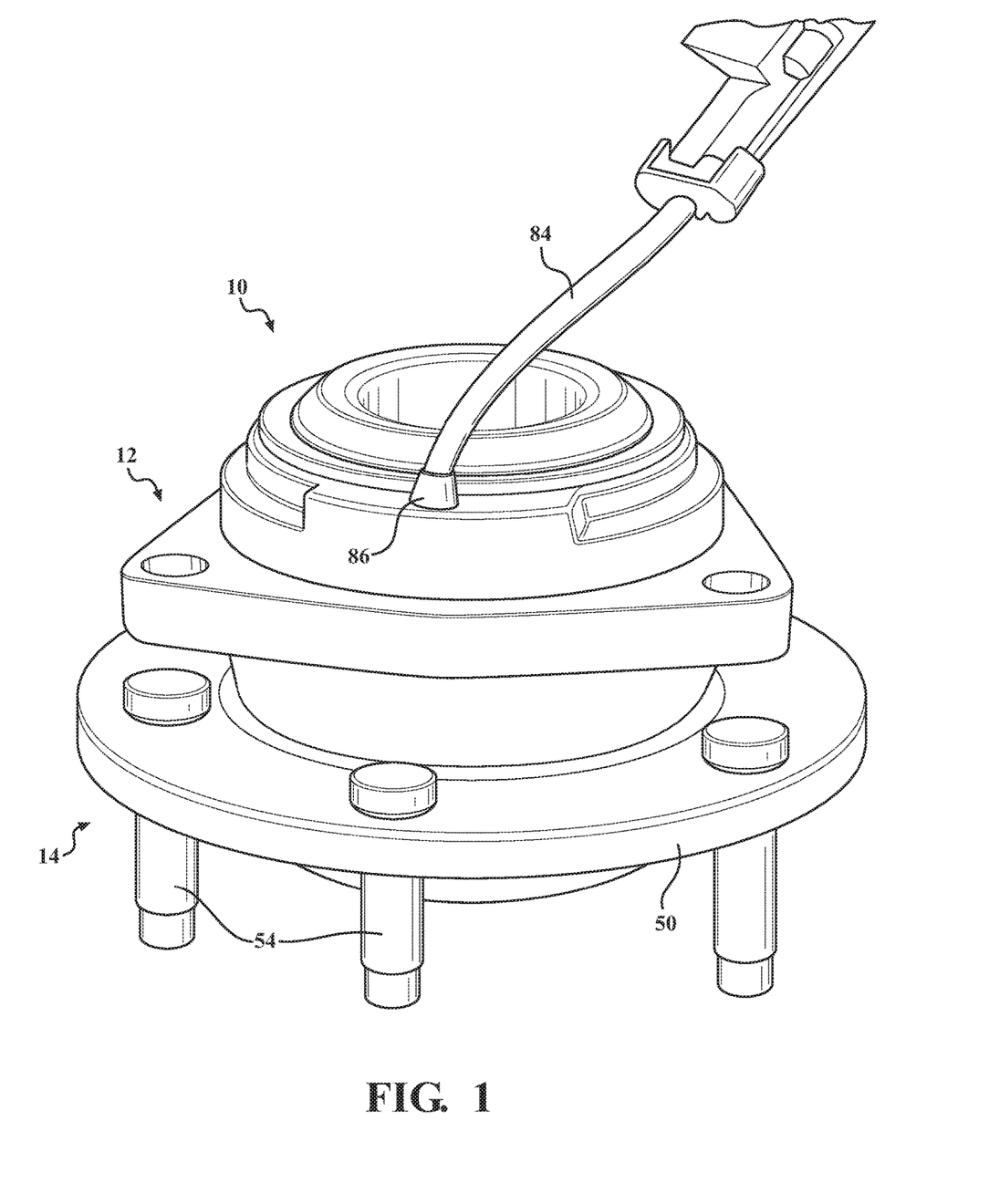
FIG. 1 is perspective view of a wheel hub assembly according to an embodiment.

The wheel hub assembly is generally indicated at 10 in FIGS. 1 and 2 and is designed with sealing features that enable the hub assembly 10 to withstand the rigors of the validation test without leaking, as will be explained in more detail below.

The wheel hub assembly 10 is understood to be of the type used on vehicles, and more particularly automotive vehicles including some trucks for mounting a wheel (not shown) of the vehicle to the chassis.

As illustrated, the wheel hub assembly 10 includes a non-rotatable part in the form of a mounting base 12 and a rotatable part in the form of a wheel hub 14. The mounting base 12 may also be called an outer member and may comprise a generally cylindrical central base portion 16 disposed about a central longitudinal axis A. A cylindrical wall of the base portion 16 extends axially between a first outboard end 20 and a second axially opposite inboard end 18. The terms "inboard" and "outboard" are used in relation to the orientation of the part when mounted in use on the vehicle, with the inboard end 18 facing inwardly and the outboard end 20 facing outwardly.

The mounting base 12 may include at least one flange 22 extending from the base portion 16 that is formed with at least one fastener hole 24 for receiving a bolt or the like (not shown) for securing the mounting base 12 to a portion of the vehicle, such as the steering knuckle. The mounting base may be made of metal, such as steel, and may cast or forged.

The base portion 16 of the mounting base 12 has a ring-like structure and includes an inner annular surface forming a central passage 26 sized for accommodating a cylindrical body portion 30 of the wheel hub 14. The body portion 30 extends between an inboard end 32 and an outboard end 34. An outer annular surface of the body portion 30 may include a stepped portion 36 adjacent the inboard end 32 for receiving a cylindrical insert 38. The insert 38 may be captured by a rolled end flange 39 of the wheel hub 14.

Figure 2:
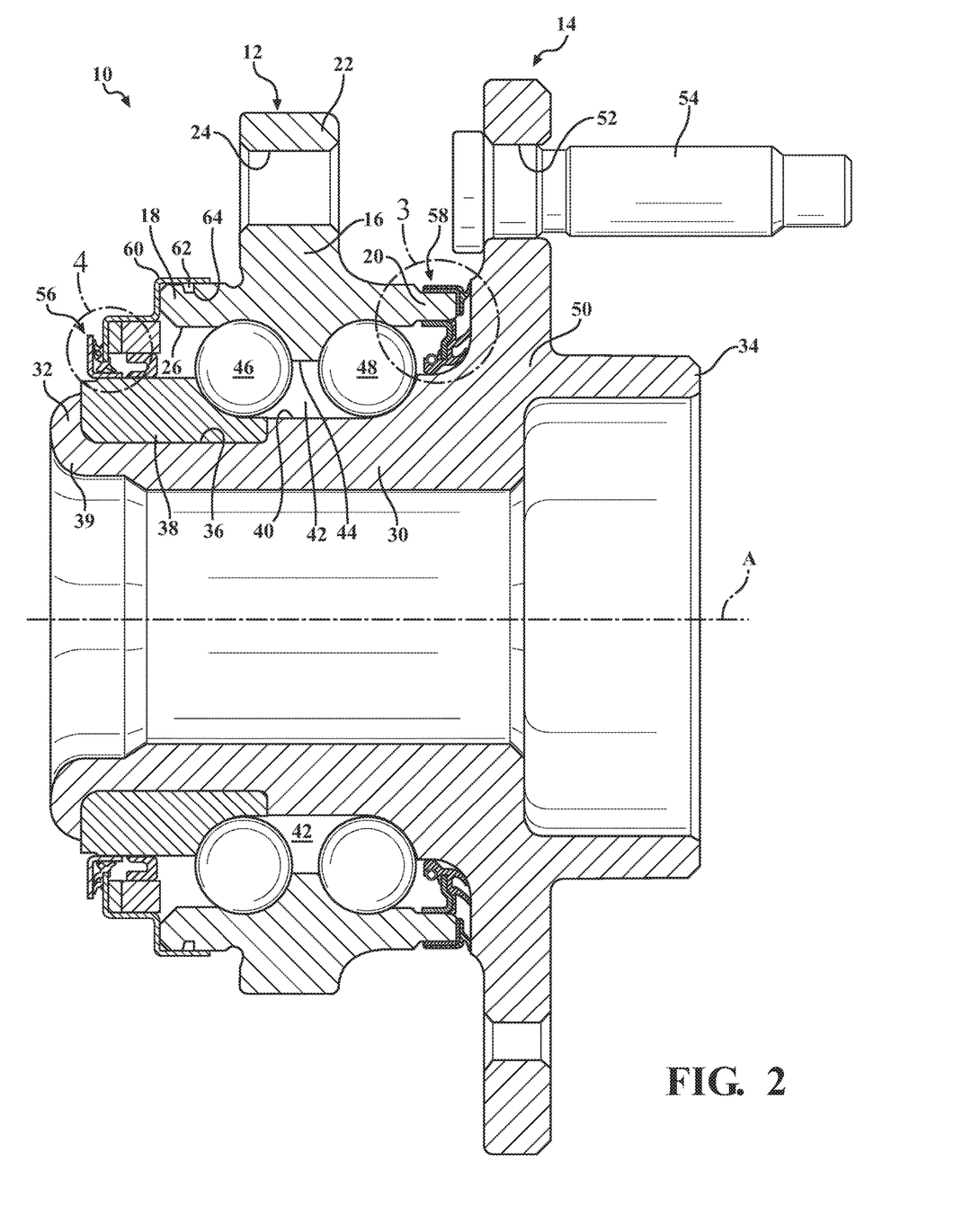
FIG. 2 is a longitudinal cross-sectional view of the wheel hub assembly of FIG. 1.

As best illustrated in FIG. 2, the insert 38, together with the adjacent portion of the body portion 30 are shaped to provide an inner bearing race surface 40 that is spaced across an annular gap 42 from a cooperatively-shaped outer race surface 44 of the base portion 16 of the mounting base 12. Captured within the annular gap 42 is at least one and preferably two sets or rows of bearings (preferably ball bearings) 46, 48 that engage corresponding surfaces of the inner and outer races 40, 44 for supporting the wheel hub 14 for rotation about the axis A relative to the mounting base 12. The shape of the races 40, 44 form two annular tracks or raceways in which the bearing balls 46, 48 roll. It will be seen that the inner race 40 has inboard and outboard portions of the tracks that wrap part way up the sides of the bearings 46, 48, with the inboard part formed by the annular insert 38. Such retains the bearings 46, 48 from moving laterally outwardly of their respective tracks. The outer race 44 similarly includes inboard and outboard portions that wrap part way down the opposite sides of the bearings 46, 48 to retain them within the tracks from lateral inward movement. It will also be appreciated that the assembly of the mounting base 12 and wheel hub 14 is achieved by first sliding the wheel hub 14 into the outboard end 20 of the mounting base 12 and capturing the outboard set of bearings 48 in the outboard raceway formed between the hub 14 and base 16. The inboard bearings 46 are then installed and the insert 38 slid into position after which the inboard end 18 of the base 12 is roll formed to mechanically roll the end outwardly into the form of a roll-formed flange which tightly retains the insert 38 and causes the inboard bearings 46 to be captured in the inboard raceway. This construction and assembly supports the hub 14 for free rotation about the axis A relative to the stationary base 12, while retaining the hub 14 against relative axial movement (apart from slight clearances between the bearings and their raceways).

The wheel hub 14, outward of the outboard bearings 48, transitions into an annular flange 50 which extends normal to the axis A. The flange is formed with a plurality of openings 52 in which corresponding press-fit fasteners or mounting lugs 54 are received which correspond in number and pattern to mounting holes in a wheel of the vehicle (not shown) to be mounted on the hub 14 via lug nuts (not shown) which thread onto the lugs in usual fashion. Once mounted, the wheel is rotatable with the hub 14 relative to the stationary base 12.

The annular gap 42 in which the bearings 46, 48 are disposed is open to the inboard and outboard sides of the bearing sets by virtue of the space between the hub 14 and base 12 for enabling relative rotation. The gap 42 is closed off by a sealing arrangement or system. More particularly, the inboard side of the gap 42 is closed off by provision of an inboard seal 56, and the outboard side of the gap 42 is closed off by provision of an outboard seal 58. Details of the seals 56, 58 follow, but each is designed in a way that individually and collectively seals the gap 42 against ingress of contaminants under even the harshest conditions in which the assembly 10 is subjected to extreme thermal cycling or shock in the presence of contaminants in a way that other known wheel hub seal designs have been unable to achieve based on a new seal integrity assessment test, also described below. In this way it is assured that the greased bearings 46, 48 contained within the gap or space 42 are not exposed to outside contaminants to a degree which could lead to reduced performance, damage to the bearings or raceways and/or premature failure. "Contaminants" as used throughout the specification, includes water and water-based fluids, moisture or vapor. Such would include slush and ice as well as salt and other chemically-treated water. Mud, dirt and sand are also included among undesirable outside contaminants of which are to be excluded, as is road grime and other debris typically encountered by wheel hub assemblies in their everyday use.

Figure 4:
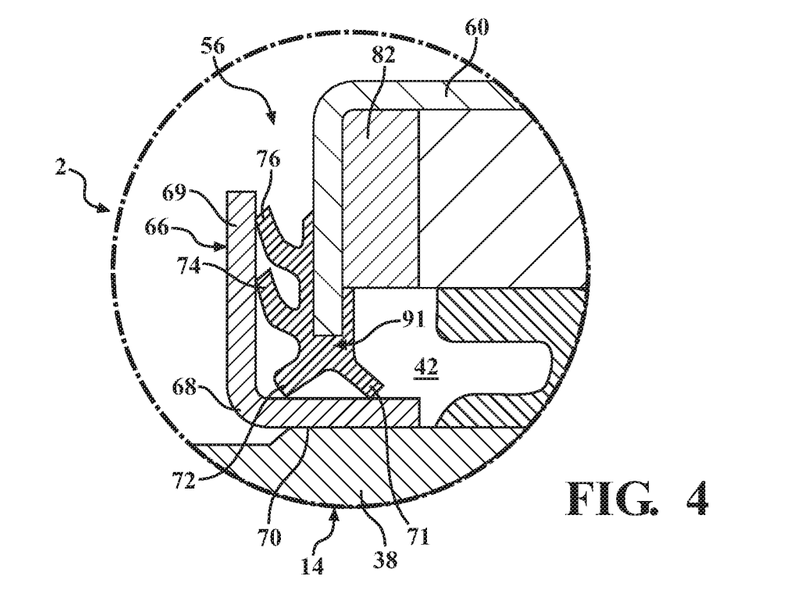
FIG. 4 is an enlarged sectional view of encircled portion 2 of FIG. 2.

As best shown in FIGS. 2 and 4, the inboard seal 56 has an annular carrier 60, preferably made of metal, that is slid with a tight fit onto the inboard end of the base 12 to securely fasten the carrier to the base 12. A fluid-tight connection is established at the interface between the carrier 60 and the base 12 to prevent contaminants from reaching the sealed space 42 in which the bearings 46, 48 are contained through this point of potential ingress. The fluid-tight connection is provided by a resilient O-ring 62 received in an O-ring groove 64 provided adjacent the inboard end 18 of the mounting base 12. The O-ring 62 extends out of its groove 64 and is tightly compressed between the inner diameter of the carrier 60 and the base and sides of the groove 64, assuring that no or essentially no contaminants can enter between the carrier 60 and base 12 and make their way to the sealed space 42, even under the harsh test conditions described below.

The carrier 60 extends over the inboard free end of the base 12 and radially inwardly toward the hub 14. A slinger 66, preferably made of metal such as steel, is press-fit onto the inboard end of the hub 14 for rotation therewith about the axis A. The slinger 66 has a cylindrical mounting collar 68 that is slid into position about the inboard end of the hub 14 and a flange 69 that flares radially outward of the collar 68 in overlapping but axially outwardly spaced relation to the radially inwardly projection portion of the carrier 60, forming an L-shaped gap between the slinger 66 and carrier 60 that defines the inboard-most end of the passage into the space 42, once the inboard seal 56 is mounted. A sealant 70, such as Loctite® is provided at the interface between the collar 68 and hub 14 to form a fluid-tight seal therebetween in order to preclude outside contaminants from passing by the interface and entering the space 42 in which the bearings 46, 48 are sealed, even under the extreme conditions set forth herein. The carrier 60 is stationary in use, while the slinger 66 rotates with the hub 14 relative to the carrier 60. The L-shaped gap between the carrier 60 and slinger 66 is sealed by a new sealing system with extreme sealing integrity not previously known in prior inboard seals for wheel hub assemblies, particularly under the extreme test conditions described herein.

The inboard sealing system 56 includes a seal body 91 fixedly attached to carrier 60 and comprising a plurality of dynamic seal lips (71, 72, 74, 76), all of which are contained within the L-shaped gap, including the outer-most seal lip 76, and all of which act under a constant bent bias force which provides both dynamic and static sealing capability even under extreme conditions. The inboard sealing system 56 includes preferably two primary inner seal lips 71, 72 which project from the carrier and sealingly engage the outer diameter surface of the collar 68 of the slinger 66. These seal lips 71, 72 are splayed in opposite directions, with the inward-most seal lip 71 laying down along the collar 68 and projecting toward the inboard set of bearings 46. The arrangement and orientation acts to keep grease from the space 42 from escaping past the seal lip 71. The next primary seal lip 72 likewise lays down against the outer diameter surface of the collar 68 but extends in the opposite direction axially away from the inboard bearings 46. Such keeps any contaminants that may have reached the seal lip 72 from passing by into the sealed space 42.

The inboard sealing system 56 also includes at least two secondary outer seal lips 74, 76 which project from the collar 68 and sealingly engage the axially inner surface of the slinger flange 69. Both outer secondary seal lips 74, 76 are contained in the L-shaped gap and both are under a constant bent bias force to provide both dynamic and static sealing performance. The inward-most secondary seal 74 bridges the gap between the carrier 60 and slinger flange 69 and lays down against the axially inner surface of the flange 69 while bending so that the free end of the seal lip projects radially outwardly toward the other secondary seal 76. The outward-most secondary seal 76 likewise bridges the gap and lays down in the same manner as seal lip 74 against the axially inner surface of the flange 69. It too bends outwardly so that the free end of the seal lip 76 extends toward, but not beyond, the free end of the flange 69. In other words, The seal lip 76 is contained within the L-shaped gap and is constructed and acts in a similar way as the secondary seal lip 74, and does not act as a labyrinth or dust-type shield as some outermost seal do by lapping over the free end slinger, externally of the groove. With the present secondary seal lip 76, any contaminants which may encounter the L-shaped gap are first blocked from entry into the sealed space 42 by the secondary seal lips 76, 74 and if by chance any contaminants pass by the secondary seal lips 74, 76 then the primary seal lips 71, 72 preclude any further invasion into the sealed space 42, even under the extreme use conditions of thermal shock (quench) in the presence of a contaminant (such as water or water-based fluids), and especially while in a static seal conditions (i.e., the hub 14 is stationary and the L-shaped gap submerged in the contaminant while undergoing thermal shock).

The outboard seal 58 is also designed to provide a level of sealing integrity not known to prior outboard seals for wheel hub assemblies, especially under the extreme validation test conditions described herein. As illustrated best in FIGS. 2 and 3, the outboard seal 58 includes an inner primary seal 88 and an outer secondary seal 90. The inner primary seal 88 and outer secondary seal 90 are separate constructions. In this regard, the inner primary seal 88 includes its own carrier 92, preferably of metal and more preferably steel, that has a cylindrical mounting portion 94 and a radially inwardly extending flange portion 96. The outer diameter surface of the mounting portion 94 is pressed into firm engagement with a corresponding inner diameter surface of the mounting base 16 adjacent its outboard end. An added sealant 98, such as rubber or Loctite® is provided at the interface of the mounting portion 94 and mounting base 16 to provide a fluid-tight seal, such that any contaminants that reach the interface are precluded from passing through and reaching the sealed space 42 in which the bearings are contained through the interface.

Figure 3:
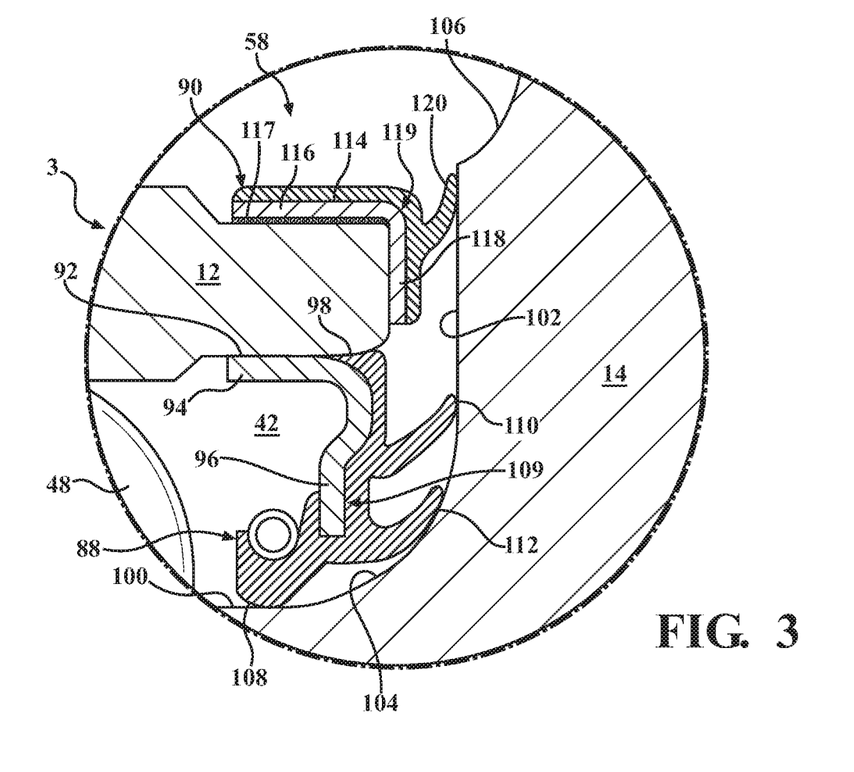
FIG. 3 is an enlarged sectional view of encircled portion 1 of FIG. 2.

The gap 42 between the portions of the base 12 and hub 14 in which the outboard seal 56 is contained is generally J-shaped, wherein the surface of the wheel hub 14 just beyond the outboard bearing set 48 includes horizontal portion 100 immediately adjacent the bearings 56 that is parallel to the axis A, and a vertical portion 102 that is perpendicular to the axis and extends past the outboard end 18 of the base 12. A radiused inside corner 104 forms a transition between the horizontal and vertical portions 100, 102. The vertical portion 102 represents a thickened portion of the flange 50 of the hub 14. Radially outward of the vertical portion 102 the flange 50 steps down in size to the thinner disc on which the lugs are mounted. There is a radius 106 at the transition, marking the end of the vertical portion 102. The radius 106 is radially axially spaced from the outboard end 34 of the base 16.

The inner outboard seal 88 includes a plurality of seal lips 108, 110, 112. The seal lips 108, 110, 112 can be formed from rubber or other suitable natural or synthetic materials. The seal lips include inner-most first seal lip 108, an outermost seal lip 110 and an intermediate seal lip 112. All of the seal lips 108, 110, 112 are formed on a seal body 109 fixedly attached on the flange 96 of the carrier 92. The inner-most seal lip 108 extends from the seal body 109 affixed to the carrier 92 and lays against the horizontal portion 100 of the hub 14, projecting axially toward the bearings 58. The lip 108 may be a hydrodynamic-type seal that in operation pumps any lubricant that reaches the lip 108 back toward the sealed space 42, and for this purpose may include a thread form that reacts with the rotating hub surface to achieve the pumping action. The intermediate seal lip 112 is axially outward of the first seal lip 108 and is constantly biased in bent form against the radiused portion 104 of the hub 14, with the lip 114 extending in the opposite direction as that of the seal lip 108 up the radius 104 toward the mouth of the J-gap. The outmost seal lip 110 also extends from the seal body 109 affixed to the carrier 92 and is in constant biased and bent form lying against the vertical portion 102 radially inwardly of the outer secondary seal 90. All three seal lips 108, 100, 112 provide both dynamic and static sealing, functioning to keep the grease within the space 42 while keeping outside contaminants out of the space 42. The rubber or other seal material used to make the lips 108, 110, 112 may extend above the base of the lip 110 along the flange 96 and onto at least a portion of the cylindrical portion 94 to provide the sealant at the interface between the cylindrical portion 94 and base 16, providing a fluid-tight seal at the interface.

The outboard outer secondary seal 90 has seal body 119 fixedly attached to a carrier 114, preferably of metal such as steel, that includes a cylindrical mounting portion 116 and a radial flange portion 118. The cylindrical portion 116 is pressed into tight engagement with an outer diameter portion of the base 12, with the flange 118 projecting radially inwardly over the outboard end face of the base 12. A sealant 117, such a Loctite® is applied to the cylindrical portion 116 and optionally the flange portion 118 to increase the holding force and also to provide a fluid-tight seal at the interface between the carrier 114 and base 12, such that outside contaminants are unable to pass through the interface and reach the sealed space 42, even under the extreme conditions described herein. The seal 90 has at least one seal lip 120 that projects from the seal body 119 affixes to the carrier 114 into bent and constantly biased engagement with the hub 14, laying down against the vertical portion 102 radially outward of the seal lip 110 and in the same direction. The seal lip 120 projects away from the seal lip 110 toward the mouth of the J-gap. It will be seen that the lip 120 remains in the vertical space region between the end of the base 12 and the vertical wall portion 102 (gap uniform) and that the lip does not project beyond the vertical portion 102 into the radius 106, thus keeping a tight bend and bias on the lip 120 so it is effective at blocking ingress of contaminants both in a dynamic and static state in use. This is unlike other hub seal where the outermost seal lip is outside the J-gap and extends into the radius, allowing for contaminants to pass by under the extreme use conditions described herein.

Figure 5:
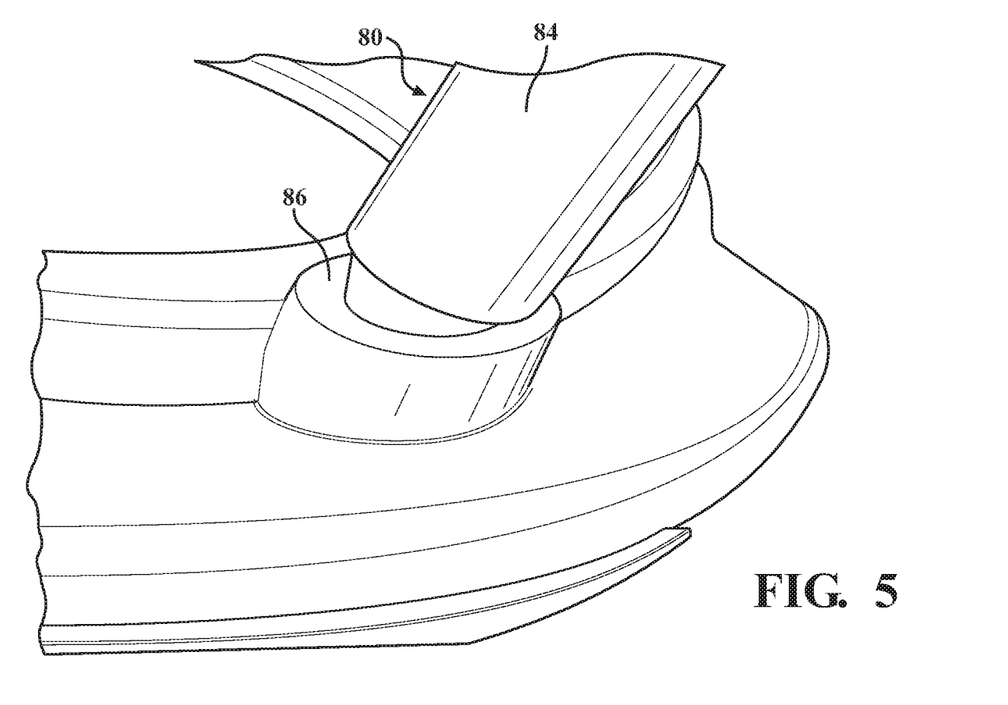
FIG. 5 is an enlarged fragmentary view of the sealed ABS cable.

The assembly 10 includes an integrated wheel speed sensor system 80 that in use forms part of an anti-lock braking system (ABS) of the vehicle. As best seen in FIG. 4, the sensor system 80 may include a ferromagnetic sensor ring 82 mounted on the wheel hub 14 for rotation therewith at a location axially between the inboard seal 56 and inboard bearing set 46, and thus protected from contaminants in the same manner as the bearing set 46, as illustrated in FIG. 2. The sensor system 80 further includes an ABS cable 84, as seen in FIGS. 1 and 5, that extends through an opening in the wheel hub assembly 10 for external connection to ABS controller (not shown). Importantly, the opening through which the cable 84 extends is sealed in a fluid-tight manner to preclude contaminants from entering the sealed space 42 at the interface of the cable 84 and opening, as further illustrated in FIG. 5. Preferably, a rubber or other flexible and preferably resilient plastics grommet 86 can be molded in situ about the cable 84 and opening such that the grommet 86 bridges the space and is adhered to each of the cable 84 and material surrounding the opening to render the interface fluid-tight, while still permitting flexibility of the cable 84 adjacent the opening. It is recognized herein as part of the overall sealing system of the assembly 10 that the interface between the cable 84 and its opening into the hub assembly 10 represents another possible leak path to the interior sealed space 42 of the hub assembly, and thus measures are taken by virtue of the molded grommet 86 to provide a level of sealing integrity sufficient to prevent ingress of contaminants at this interface even under the harshest of conditions, as represented by the integrity test, to successfully block off yet another path of possible leakage into the space 42. Some prior attempts to seal this interface involved placement of a boot or shield that slid over the cable, but such an approach still may leak under extreme conditions as the interface between the boot and cable is not guaranteed to be fluid tight over the life of the wheel hub assembly, unlike the molded grommet 86 of the embodiment.

The wheel hub assembly 10 thus has numerous locations or sites where contaminants threaten to enter into the sealed space. The interface of the carriers 60, 92, 114; the interface of the slinger 66; the seal lips of the inboard 56 and outboard 58 seals, and the ABS cable 84. The assembly 10 has been designed to recognize each of these locations as possible sources of leakage and each site has been engineered to seal off each of these sites so that the assembly can function in extremely harsh use conditions, as represented by the newly conceived integrity test, without contaminants leaking past these sites and into the sealed space 42.

Figure 6:
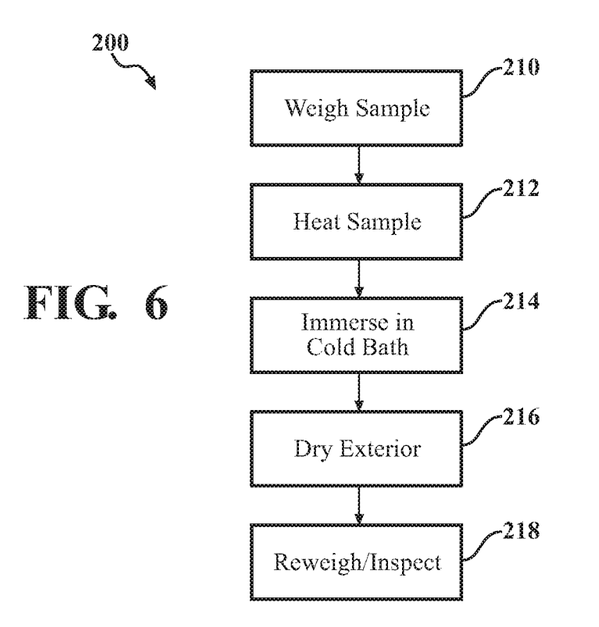
FIG. 6 is a flow chart of the method for testing the sealing integrity of a wheel hub according to an embodiment.

A new seal integrity test method 200 is shown in FIG. 6. The test method involves subjecting newly manufactured wheel hubs to certain test conditions that represent extreme harsh operating conditions that the wheel hub may experience over the course of its usable life. By newly manufactured, it is meant that the wheel hub assemblies have not been used in service on vehicles or remanufactured, etc., but rather are prepared for first use. Application of the new seal integrity test method 200 is not limited to newly manufactured wheel hubs, but may also be used on wheel hubs that have been previously used in service on vehicles or remanufactured. While previous integrity tests have been developed and are known to the industry, none are known to be as rigorous as the present test and none are known to account for certain operating conditions that some wheel hubs may see during extreme use.

The new seal integrity test includes a fluid contaminant immersion/thermal shock test. Water or a water solution in this case is the preferred liquid contaminant, but those skilled in the art will appreciated that other fluids could be employed such as if the wheel hub is intended or expected to be exposed during use to a particular fluid or other contaminant. The immersion test is coupled with extreme thermal cycling or shock, unlike prior known water immersion tests.

In the method 200 associated with the water immersion/thermal shock test, wheel hub test samples 10 are weighed 210 and then exposed to a heating environment 212, followed by plunging the test samples into a cold bath of water (or other contaminant) 214, dried 216 and reweighed 218. The samples may be as-manufactured new wheel hub assemblies or may be new ones that first passed the mud/salt/load test above. Samples subjected to the immersion test are validated to have passed if, after testing and weighing, the samples have gained less than 3 grams, and more preferably less than 1 gram, and still more preferably less than 0.1 gram, and most preferably exhibit no or essentially no mass gain. Verification can be carried out by disassembling one or more samples to check for evidence of intrusion past the seal points. A leak detection dye (e.g., a fluorescent sensitive dye) can be added to the water bath, such that if water has reached the sealed space, evidence of such can be visibly detected when exposed to fluorescent light upon disassembly of the wheel hub.

The samples 10 should be cleaned of external debris and then weighed to record an initial mass of the sample. The temperature to which the samples 10 are subjected may vary, but preferably they are placed in a chamber set at an elevated target temperature of about 200° F., and preferably 200° F. The elevated target temperature may be higher than 200° F. as well. A thermocouple is preferably connected to the hub flange to monitor the temperature of the assembly while in the chamber. The wheel hub is preferably placed in the chamber in a horizontal position. The samples 10 are left in the chamber for a predetermined time or until the hub flange temperature reads about or precisely 200° F., or above, in accordance with the selected elevated target temperature.

The bath of contaminant should be of sufficient dimension and volume to fully immerse the wheel hub assembly 10 (for example, 5 gallons may be sufficient to fully immerse the hub assembly). After the assembly has been heated to the target elevated temperature (preferably 200° F.), it is removed from the chamber and immediately plunged into the bath of contaminant making sure that it is fully immersed. For this test embodiment, the bath of contaminant is a solution of water containing leak detection die. The temperature of the bath is held at a target reduced temperature of about or precisely 35-40° F., and it may be an ice bath. The various seal points of the sample are thus exposed to both a sudden thermal shock cycle wherein the different materials present at the interfaces experience the same or different rates of thermal contraction all while trying to maintain a fluid-tight seal in the presence of full exposure to liquid contaminant. In other words, the 160-165 degree temperature differential between the extremely hot wheel hub assembly test part and the extremely cold fluid contaminant bath imparts an immediate thermal shock to the wheel hub assembly 10 while fully and simultaneously exposed to the contaminant at all seal points of the wheel hub 10. Such an extreme thermal shock may be experienced, for example, when a vehicle equipped with the wheel hub is operating under heavy load (high speed or towing a heavy trailer) and suddenly is shocked with water or other contaminants, such as backing a boat trailer into a cold lake after a long haul, or encountering a deep pool of water or slush while under heavy demand from the wheel hub which caused it to be hot. Known wheel hub assemblies failed under these validation conditions whereas the wheel hub assembly constructed according to described embodiments performed without having their seals infiltrated by the water solution.

The test sample 10 is kept immersed in the bath for an extended period, such as 1 hour, to test the effectiveness of the seal points under these extreme thermal shock conditions. This test sample is then removed from the bath and drip dried for 2 hours. Any remaining water is wiped from the exterior and the test sample without disturbing any fluid contaminant that may have entered the sealed space 42. The externally dried sample 10 is reweighed on a gram scale that measures to 4 places (0.0001). A sample is validated and "passes" if the mass gain is less than 3 grams, and more preferably less than 1 gram, and still more preferably less than 0.1 gram, and most preferably if there is no or essentially no mass gain. According to actual testing, a wheel hub assembly constructed according to the described embodiment showed zero mass gain after the immersion/temperature shock test. Samples were also disassembled and there was no evidence of liquid contaminant having reached the sealed space 42. By comparison, newly manufactured hubs from eight different competitors were tested and all of them had evidence of leakage past their seal points.

| Test Sample | Pass/Fail Mass Gain (g) |
|---|---|
| Radical 513179 | Fail 16 g |
| AC Delco 19259596 | Fail 15 g |
| Timken TKSHF00028 | Fail 14 g |
| Mevotech TXF513121 | Fail 14 g |
| Dorman 951-061 | Fail 5 g |
| GMB 730-0003 | Fail 18 g |
| NTN WE60702 | Fail 18 g |
| Kaiyuan 513179 | Fail 20 g |
| Inventive Embodiment | Pass 0 g |

The range of mass gain (due to water intrusion into the sealed space) ranged from 5 grams to 22 grams for the above competitive known wheel hub samples. Water intrusion in these competitor samples was verified by disassembly and inspection, with all showing visible evidence of water leakage into the sealed bearing chamber by the presence of water and the leak detection die in the sealed bearing spaces. In other words, all competitor wheel hub assembly samples for eight different manufacturers failed the new immersion test. Only the newly designed wheel hub assembly 10 herein (Inventive Embodiment in the above table) successfully passed the new water immersion/thermal shock test, verifying that the seal system that accounts for all sealing points is superior to known existing competitive wheel hubs presently on the market.

The new seal integrity test may, optionally, be preceded by a mud/salt spray test which involves subjecting the wheel hub to a mud/salt spray environment, but while under a load. In other words, this test is not simply one where the wheel hub assembly is exposed to harsh chemicals over an extended period, but one where the wheel hub assembly is further placed under a load. The mud with salt spray test employs a slurry of mud and salt in water. The composition can vary but may comprise about or precisely 10 wt. % mud and about or precisely 0.5 wt % salt in water. Test samples of the wheel hub assemblies 10 are first weighed. They are then operated in a controlled chamber at high speed and under heavy load. Specifically, the wheel hub is operated at about or precisely 1000 rpm under a load of about or precisely Fr=7.35 kN, Fa=2.2 kN for about or precisely 2 hours while constantly bathed in a spray of the mud/salt/water slurry at about or precisely 6-7 L/min, followed by about or precisely a 2 hour rest with the wheel hub 10 suspended. The wheel hub assembly is run for 24 cycles (96 hours total). Following testing, the samples are thoroughly dried and reweighed. The samples are validated if less than about or precisely 3% mass gain has occurred as a result of the test and the ABS sensor functions properly. At least two samples are also disassembled and the interior inspected for corrosion, especially to the interior of all of the mentioned seal points. The samples are validated if there is no evidence of no the slurry contaminant reaching the sealed space in which the bearings are contained. Samples prepared according to the embodiment exhibited less than 3% mass gain, and more particularly no mass gain.

Obviously, many modifications and variations of the present invention are possible in light of the above teachings. It is, therefore, to be understood that the invention may be practiced otherwise than as specifically described while still being within the scope of the invention.

What is claimed is:

1. A method of evaluating water intrusion into a newly manufactured wheel hub assembly comprising a mounting base, a wheel hub, an annular gap between the mounting base and the wheel hub, lubricated bearings disposed in the annular gap for supporting the wheel hub for rotation relative to the mounting base, and a sealing arrangement for limiting the intrusion of water into the annular gap, comprising the steps of:
   placing the wheel hub assembly into a heating chamber for a period of time until at least a portion of the wheel hub assembly reaches a target elevated temperature of about 200° F.;
   removing the wheel hub assembly from the heating chamber after the portion of the wheel hub assembly is heated to at least the target elevated temperature;
   providing a cooling environment comprising a liquid that is maintained at a target reduced temperature in the range of 35-40° F.;
   immersing the wheel hub assembly, after removing it from the heating environment, into the cooling environment such that the wheel hub assembly experiences a temperature differential of 160-165° F. from the target elevated temperature to the liquid of the cooling environment; and
   removing the wheel hub assembly from the cooling environment after a pre-determined time period.

2. The method of evaluating water intrusion into a wheel hub assembly of claim 1, further comprising the steps of:
   taking a first measurement of the mass of the wheel hub assembly prior to the step of placing the wheel hub assembly into the heating environment; and
   taking a second measurement of the mass of the wheel hub assembly after removing the wheel hub assembly from the cooling environment.

3. The method of evaluating water intrusion into a wheel hub assembly of claim 2, further comprising the step of:
   drying the external surface of the wheel hub assembly after removing the wheel hub from the cooling environment and prior to taking the second measurement of the mass of the wheel hub assembly.

4. The method of evaluating water intrusion into a wheel hub assembly of claim 3, wherein the second measurement of the mass of the wheel hub is no more than 3.0 grams greater than the first measurement of the mass of the wheel hub.

5. The method of evaluating water intrusion into a wheel hub assembly of claim 3, wherein the second measurement of the mass of the wheel hub is no more than 1.0 gram greater than the first measurement of the mass of the wheel hub.

6. The method of evaluating water intrusion into a wheel hub assembly of claim 3, wherein the second measurement of the mass of the wheel hub is no more than 0.1 gram greater than the first measurement of the mass of the wheel hub.

7. The method of evaluating water intrusion into a wheel hub assembly of claim 3, wherein the second measurement of the mass of the wheel hub is equal to the first measurement of the mass of the wheel hub.

8. The method of evaluating water intrusion into a wheel hub assembly of claim 1, further including the step of subjecting the wheel hub assembly to a slurry of mud and salt in water while subjected to a load.

9. The method of evaluating water intrusion into a wheel hub assembly of claim 8, wherein the load includes a radial force of approximately 7.35 kN and an axial force of approximately 2.2 kN.

10. The method of evaluating water intrusion into a wheel hub assembly of claim 9, wherein the wheel hub assembly is subjected to the slurry of mud and salt in water for approximately 2 hours.

* * * * *